(12) United States Patent
Eisengruber

(10) Patent No.: US 8,051,959 B2
(45) Date of Patent: Nov. 8, 2011

(54) CONTROLLABLE OR SELECTABLE BI-DIRECTIONAL OVERRUNNING COUPLING ASSEMBLY

(75) Inventor: Gregory M. Eisengruber, Saginaw, MI (US)

(73) Assignee: Means Industries, Inc., Saginaw, MI (US)

( * ) Notice: Subject to any disclaimer, the term of this patent is extended or adjusted under 35 U.S.C. 154(b) by 349 days.

(21) Appl. No.: 12/326,954

(22) Filed: Dec. 3, 2008

(65) Prior Publication Data

US 2009/0159391 A1 Jun. 25, 2009

Related U.S. Application Data

(60) Provisional application No. 61/008,216, filed on Dec. 19, 2007.

(51) Int. Cl.
*F16D 63/00* (2006.01)
*F16D 11/04* (2006.01)
*F16D 43/00* (2006.01)

(52) U.S. Cl. ........ 188/82.3; 192/43.1; 192/46; 192/69.1

(58) Field of Classification Search .................. None
See application file for complete search history.

(56) References Cited

U.S. PATENT DOCUMENTS

| | | |
|---|---|---|
| 5,871,071 A | 2/1999 | Sink |
| 5,918,715 A | 7/1999 | Ruth et al. |
| 5,927,455 A | 7/1999 | Baker et al. |
| 5,937,980 A * | 8/1999 | Dick ................ 192/43.1 |
| 5,964,331 A | 10/1999 | Reed et al. |
| 6,065,576 A | 5/2000 | Shaw et al. |
| 6,116,394 A | 9/2000 | Ruth |
| 6,125,980 A | 10/2000 | Ruth et al. |
| 6,129,190 A | 10/2000 | Reed et al. |
| 6,186,299 B1 | 2/2001 | Ruth |
| 6,193,038 B1 | 2/2001 | Scott et al. |
| 6,244,965 B1 | 6/2001 | Klecker et al. |
| 6,290,044 B1 | 9/2001 | Burgman et al. |
| 6,333,112 B1 | 12/2001 | Field et al. |
| 6,386,349 B1 | 5/2002 | Welch |
| 6,481,551 B1 | 11/2002 | Ruth |
| 6,505,721 B1 | 1/2003 | Welch |
| 6,571,926 B2 | 6/2003 | Pawley |
| RE38,498 E | 4/2004 | Ruth et al. |
| 6,854,577 B2 | 2/2005 | Ruth |

(Continued)

OTHER PUBLICATIONS

International Preliminary Report on Patentability and Written Opinion of the International Searching Authority; International Application No. PCT/US2008/085811; date of report Jun. 22, 2010.

(Continued)

*Primary Examiner* — David D Le
*Assistant Examiner* — Jacob S Scott
(74) *Attorney, Agent, or Firm* — Brooks Kushman P.C.

(57) ABSTRACT

An overrunning coupling assembly includes a control element mounted for controlled shifting movement between coupling faces of annular coupling members relative to a first set of pockets in the first member. The control element is operable for controlling position of only reverse struts in the first set of pockets without controlling the position of forward struts in a second set of pockets in the coupling face of the second member. The control element allows at least one of the reverse struts to engage at least one of a set of locking formations on the coupling face of the second coupling member in a first position of the control element. The control element maintains the reverse struts in their pockets in a second position of the control element.

12 Claims, 5 Drawing Sheets

U.S. PATENT DOCUMENTS

| | | |
|---|---|---|
| 7,258,214 B2 | 8/2007 | Pawley et al. |
| 7,296,668 B2 | 11/2007 | Fetting, Jr. et al. |
| 7,344,010 B2 | 3/2008 | Fetting, Jr. et al. |
| 2005/0279602 A1 | 12/2005 | Ruth |
| 2006/0249345 A1* | 11/2006 | Ruth ................ 192/46 |
| 2006/0278487 A1 | 12/2006 | Pawley et al. |
| 2007/0034470 A1* | 2/2007 | Fetting et al. ............ 192/46 |
| 2007/0056825 A1* | 3/2007 | Fetting et al. ............ 192/43.1 |

OTHER PUBLICATIONS

International Search Report and The Written Opinion of the International Searching Authority, dated Feb. 13, 2009.

* cited by examiner

CONTROLLABLE OR SELECTABLE BI-DIRECTIONAL OVERRUNNING COUPLING ASSEMBLY

CROSS-REFERENCE TO RELATED APPLICATION

This application claims the benefit of U.S. provisional patent application Ser. No. 61/008,216 entitled "One-Way Clutch With 'Stacked' Struts—Each Set of Struts Having Different Radii" and filed Dec. 19, 2007.

BACKGROUND OF THE INVENTION

1. Field of the Invention

This invention relates to overrunning coupling assemblies especially for use in vehicular automatic transmissions.

2. Background Art

A typical one-way clutch consists of an inner ring, an outer ring and a locking device between the two rings. The one-way clutch is designed to lock in one direction and to allow free rotation in the other direction. Two types of one-way clutches often used in vehicular, automatic transmissions include:

Roller type which consists of spring loaded rollers between the inner and outer race of the one-way clutch. (Roller type is also used without springs on some applications); and Sprag type which consists of asymmetrically shaped wedges located between the inner and outer race of the one-way clutch.

The one-way clutches are typically used in the transmission to prevent an interruption of drive torque (i.e., power flow) during certain gear shifts and to allow engine braking during coasting.

U.S. Pat. No. 5,927,455 discloses a bi-directional overrunning pawl-type clutch having a driving member mounted for power rotation, a driven member mounted for rotation adjacent the driving member, with each of the driving and driven members having pawl engaging shoulders, and a plurality of rigid pawls interposed between the driving and driven members. A control element is mounted for shifting movement between the driving and driven members to control the position of the pawls which are yieldably biased toward positions of engagement extending between the driving and driven members to produce driving engagement therebetween. The control element is shiftable to various positions to permit driving and overrunning in one direction or driving and overrunning in the opposite direction dependent upon the direction of rotation of the driving member.

U.S. Pat. No. 6,244,965 discloses a planar overrunning coupling for transfer of torque from a driving member to a driven member in one direction and which permits freewheeling motion between the members upon a torque reversal. The coupling includes coupling plates situated in close proximity with a strut retainer plate disposed between them, one plate being connected to the driving member and the other plate being connected to the driven member, each plate having strut recesses, a series of struts located in the recesses of one plate so that each strut may be pivoted, thereby allowing the struts to engage the companion recesses in the other coupling plate. The retainer has angularly spaced apertures that register with the struts to permit pivotal movement of the struts when the retainer plate is in one rotary position. The retainer plate, when it is in a second rotary position, prevents pivotal motion of the struts, thereby permitting freewheeling relative motion of the coupling plates.

U.S. Pat. No. 6,290,044 discloses a selectable one-way clutch assembly for use in an automatic transmission comprising a strut plate rotatable about a central hub and having pockets and struts mounted therein for pivotable rotation. A selecting plate concentrically located about an activator hub has teeth extending axially inboard and configured to fit in the apertures in an activator plate. A turning device is selectively operable to activate one-way clutching mode by rotating the pin of a control plate to disengage selecting cams and displace selecting plate teeth inboard beyond the inboard face of the activator plate wherein the struts catch the teeth when the strut plate assembly is rotated in a clutching direction. The catching ends of the struts are cammed in the pockets by ramped camming ends of the teeth when the strut plate assembly is rotated in the opposing direction, thereby allowing free-wheeling of the strut plate in the overrun direction.

U.S. Pat. No. 7,258,214 discloses an overrunning coupling assembly and a method of controlling the engagement of planar first and second members wherein two sets of opposed engaging struts are applied with one motion of a single control plate or member. The planar first and second members have inside surfaces extending generally normal to a first axis. The assembly includes free-floating, forward keys and free-floating, reverse keys opposed to the forward keys. The forward and reverse keys are movable between a notch-engaging, engaged position and a disengaged position in which the second member is permitted to free-wheel relative to the first member. The planar control member is disposed between the first and second surfaces and is controllably rotatable about the first axis between first and second angular positions relative to the first member.

U.S. Pat. No. 7,344,010 discloses an overrunning coupling assembly and a method of controlling the engagement of planar first and second members wherein the assembly includes clustered pawls and their respective pawl-holding portions. The planar first and second members have inside surfaces extending generally normal to a first axis. The pawls include a forward set of free-floating pawls and a reverse set of free-floating, clustered pawls. The forward and reverse sets of pawls are movable between a notch-engaging, engaged position and a disengaged position. Because of the clustering, a control element, disposed between the first and second surfaces, need not be fully circular and is controllably rotatable about the first axis between first and second angular positions relative to the first member.

Published patent application US 2006/0278487 discloses an overrunning radial coupling assembly or clutch and a method of controlling the engagement of inner and outer plates or members of the assembly wherein adjacent engaging radial locking pawls are selectively controlled by a single, rotatable control plate or element to obtain full lock, one-way lock and one-way overrun conditions. The assembly includes free-floating, forward pawls and free-floating, reverse pawls adjacent to their respective forward pawls. The forward and reverse pawls are movable between a notch-engaging, engaged position (i.e., full lock condition) and a disengaged position in which the outer member is permitted to free-wheel relative to the inner member in the one-way overrun condition in one direction about a first axis and the outer member is locked to the inner member in the one-way lock condition in the opposite direction. A number of different embodiments of the assembly and method are provided.

Other related U.S. patent publications include U.S. 2005/0279602 and the following U.S. patents:
U.S. Pat. Nos. 7,296,668; 6,854,577; RE 38,498; 6,571,926; 6,505,721; 6,481,551; 6,386,349; 6,333,112; 6,193,038; 6,186,299; 6,129,190; 6,125,980, 6,116,394; 6,065,576; 5,964,331; 5,918,715; and 5,871,071.

One problem associated with the prior art selectable or controllable one-way clutches, is that a control plate or element is used to contain or control both forward and reverse struts in a stationary pocket plate. Consequently, a relatively large quantity of lubricating fluid or oil is required to dampen the forward struts during overrun.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling," "clutch" and "brake" may be used interchangeably.

SUMMARY OF THE INVENTION

An object of at least one embodiment of the present invention is to provide an improved controllable or selectable overrunning coupling assembly.

In carrying out the above object and other objects of the present invention, an overrunning coupling assembly is provided. The assembly includes first and second annular coupling members that are supported with respect to each other for relative rotation about a common rotational axis. The first and second coupling members have annular coupling faces that oppose each other. The coupling face of the first coupling member has a first set of pockets spaced about the rotational axis. Each pocket of the first set has a pivotal reverse strut received thereby. The coupling face of the second coupling member has a second set of pockets spaced about the rotational axis. Each pocket of the second set has a pivotal forward strut received thereby. The coupling face of the first coupling member has a first set of locking formations that are engaged by the forward struts upon projecting outwardly from the pockets of the second coupling member to prevent relative rotation of the coupling members with respect to each other in a first direction while permitting relative rotation of the coupling members with respect to each other in the opposite second direction by pivoting of the forward struts in the pockets of the second coupling member. The coupling face of the second coupling member has a second set of locking formations that are engaged by the reverse struts upon projecting outwardly from the pockets of the first coupling member to prevent relative rotation of the coupling members with respect to each other in the second direction while permitting relative rotation of the coupling members with respect to each other in the first direction by pivoting of the reverse struts in the pockets of the first coupling member. The assembly also includes a control element mounted for controlled, shifting movement between the coupling faces relative to the first set of pockets and operable for controlling position of only the reverse struts without controlling the position of the forward struts. The control element allows at least one of the reverse struts to engage at least one of the second set of locking formations in a first position of the control element. The control element maintains the reverse struts in their pockets in a second position of the control element. The reverse struts are located along a line or row spaced away from a line or row along which the forward struts are located.

The coupling faces may be oriented to face axially along the rotational axis.

The reverse struts may be located outside of the forward struts.

The control element may be controllably rotatable about the rotational axis between the first and second positions. The first set of pockets may be spaced a first radius from the rotational axis and the second set of pockets may be spaced a second radius less than the first radius from the rotational axis.

The control element may be generally round and the control element may have opposite circumferential ends.

One of the coupling members may have an annular groove and the assembly may further include a generally round snap ring that is received by the annular groove in the one coupling member and an annular thrust plate located axially along the rotational axis between the other coupling member and the snap ring. The thrust plate may have a retainer projecting therefrom to prevent rotation of the thrust plate.

The snap ring may have circumferentially spaced opposite ends and the retainer may axially extend between the opposite ends of the snap ring to prevent rotation of the thrust plate.

Further in carrying out the above object and other objects of the present invention, an overrunning clutch is provided. The clutch includes first and second annular clutch members that are supported with respect to each other for relative rotation about a common rotational axis. The first and second clutch members have annular coupling faces that oppose each other. The coupling face of the first clutch member has a first set of pockets spaced about the rotational axis. Each pocket of the first set has a pivotal reverse strut received thereby. The coupling face of the second clutch member has a second set of pockets spaced about the rotational axis. Each pocket of the second set has a pivotal forward strut received thereby. The coupling face of the first clutch member has a first set of locking formations that are engaged by the forward struts upon projecting outwardly from the pockets of the second clutch member to prevent relative rotation of the clutch members with respect to each other in a first direction while permitting relative rotation of the clutch members with respect to each other in the opposite second direction by pivoting of the forward struts in the pockets of the second clutch member. The coupling face of the second clutch member has a second set of locking formations that are engaged by the reverse struts upon projecting outwardly from the pockets of the first clutch member to prevent relative rotation of the clutch members with respect to each other in the second direction while permitting relative rotation of the clutch members with respect to each other in the first direction by pivoting of the reverse struts in the pockets of the first clutch member. The clutch also includes a control element mounted for controlled, shifting movement between the coupling faces relative to the first set of pockets and operable for controlling position of only the reverse struts without controlling the position of the forward struts. The control element allows at least one of the reverse struts to engage at least one of the second set of locking formations in a first position of the control element. The control element maintains the reverse struts in their pockets in a second position of the control element. The reverse struts are located along a curved line or row spaced away from and concentric to a curved line or row along which the forward struts are located.

Yet still further in carrying out the above object and other objects of the present invention, an overrunning clutch is provided. The clutch includes first and second annular clutch members that are supported with respect to each other for relative rotation about a common rotational axis. The first and second clutch members have annular coupling faces that oppose each other. One of the clutch members has an annular groove. The coupling face of the first clutch member has a first set of pockets spaced about the rotational axis. Each pocket of the first set has a pivotal reverse strut received thereby. Each pocket of the first set includes a spring that pivotally biases its strut outwardly therefrom for locking. The coupling face of the second clutch member has a second set of pockets spaced about the rotational axis. Each pocket of the second set has a pivotal forward strut received thereby. Each pocket of the second set includes a spring that pivotally biases its strut outwardly therefrom for locking. The coupling face of the first clutch member has a first set of locking formations that are engaged by the forward struts upon projecting outwardly from the pockets of the second clutch member to prevent relative rotation of the clutch members with respect to each other in a first direction while permitting relative rotation of the clutch members with respect to each other in the opposite second direction by pivoting of the forward struts in the pockets of the second clutch member. The coupling face of the second clutch member has a second set of locking formations that are engaged by the reverse struts upon projecting outwardly from the pockets of the first clutch member to prevent relative rotation of the clutch members with respect to each other in the second direction while permitting relative rotation of the clutch members with respect to each other in the first direction by pivoting of the reverse struts in the pockets of the first clutch member. The clutch further includes a control element mounted for controlled, shifting movement between the coupling faces relative to the first set of pockets and operable for controlling position of only the reverse struts without controlling the position of the forward struts. The control element has at least one opening which extends completely therethrough to allow at least one of the reverse struts to extend therethrough to engage at least one of the second set of locking formations in a first position of the control element. The control element maintains the reverse struts in their pockets in a second position of the control element. The reverse struts are located along a line or row spaced away from a line or row along which the forward struts are located. The clutch further includes a generally round snap ring that is received by the annular groove in the one clutch member and an annular thrust plate located axially along the rotational axis between the other clutch member and the snap ring. The thrust plate has a retainer projecting therefrom to prevent rotation of the thrust plate.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
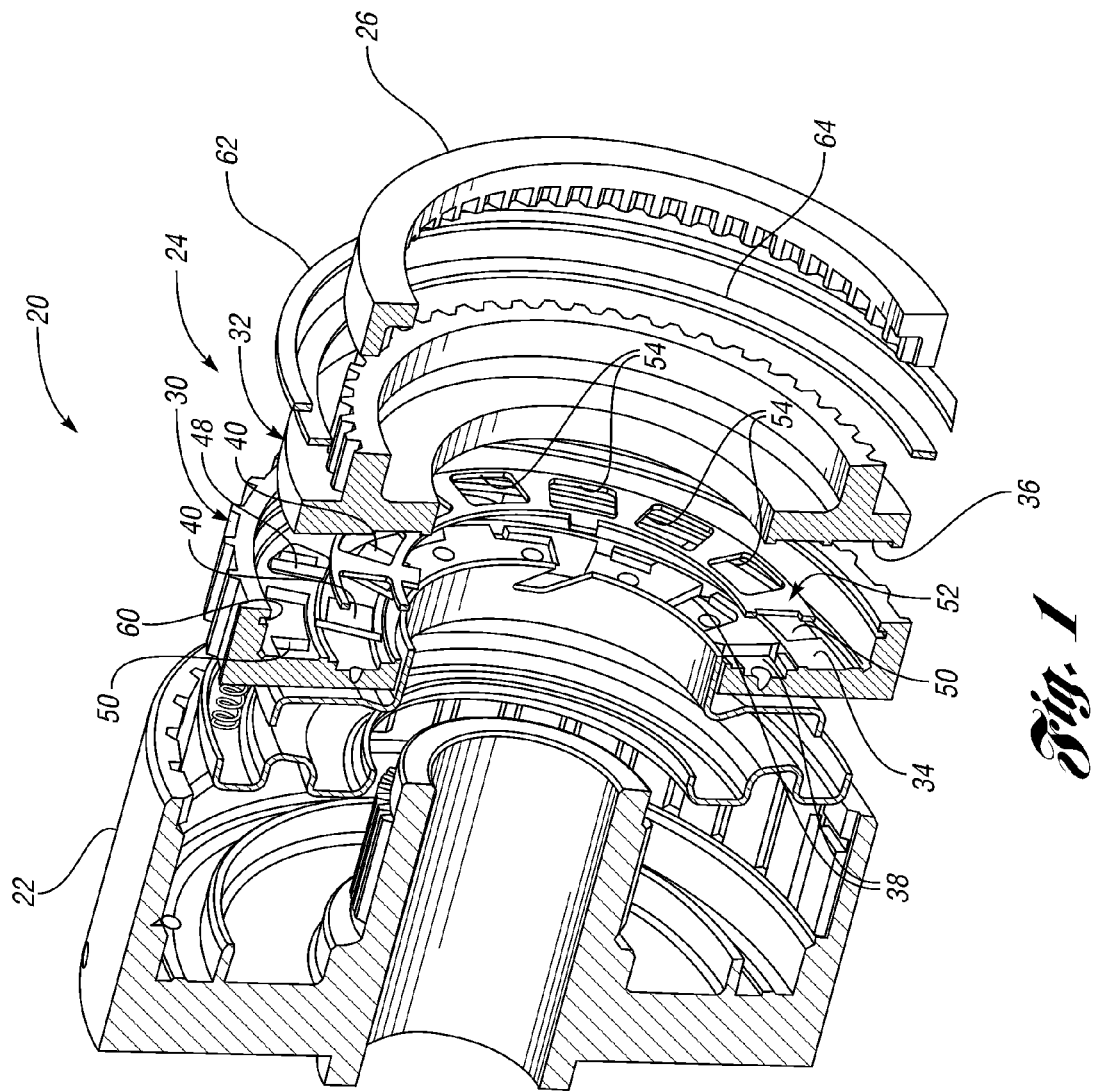
FIG. 1 is an exploded perspective schematic view, partially broken away and in cross section, of one embodiment of an overrunning coupling assembly or clutch of the present invention and a transmission housing and a drive element to control torque transmission.
Figure 2:
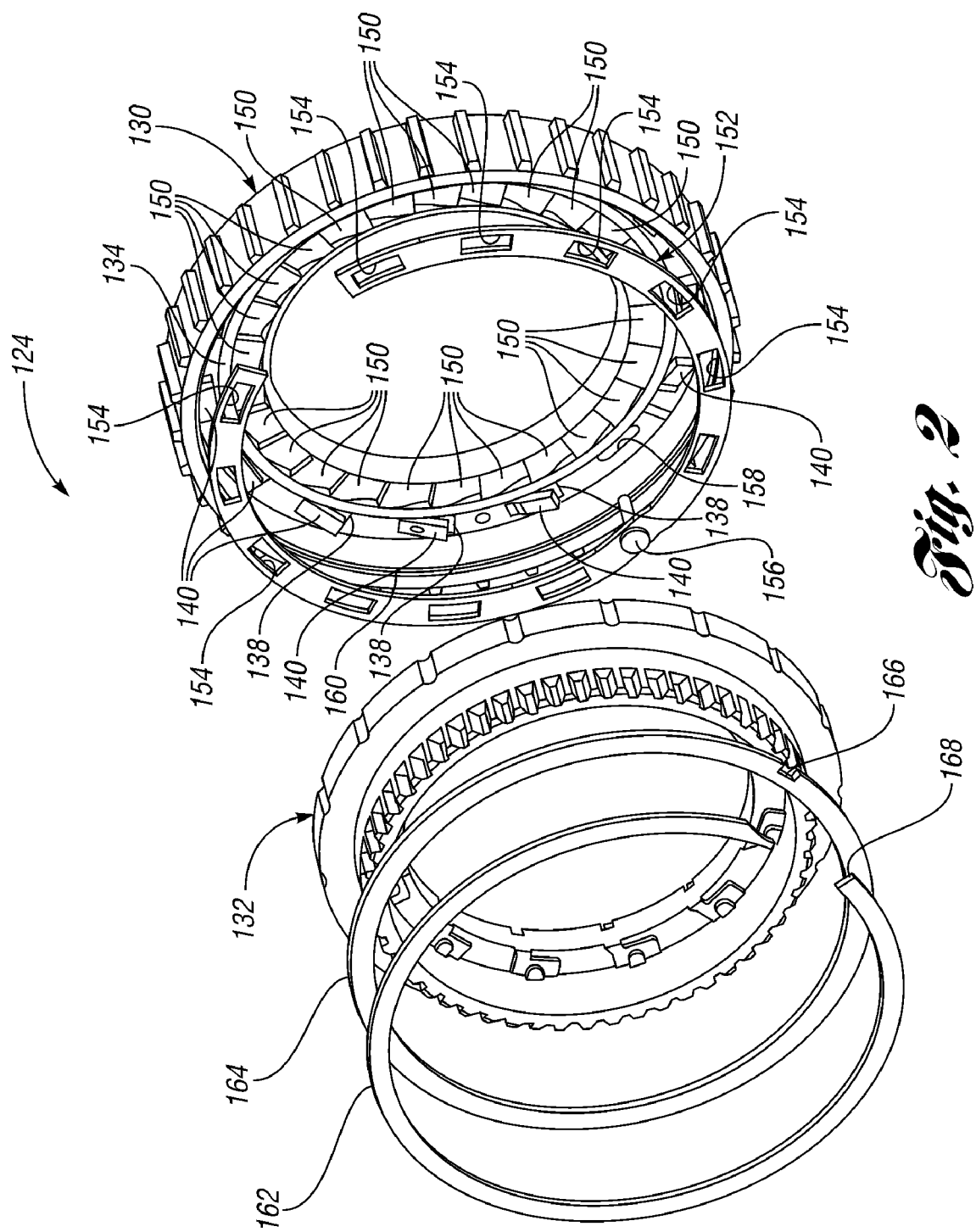
FIG. 2 is an exploded perspective schematic front view of another embodiment of an overrunning coupling assembly or clutch of the present invention.
Figure 3:
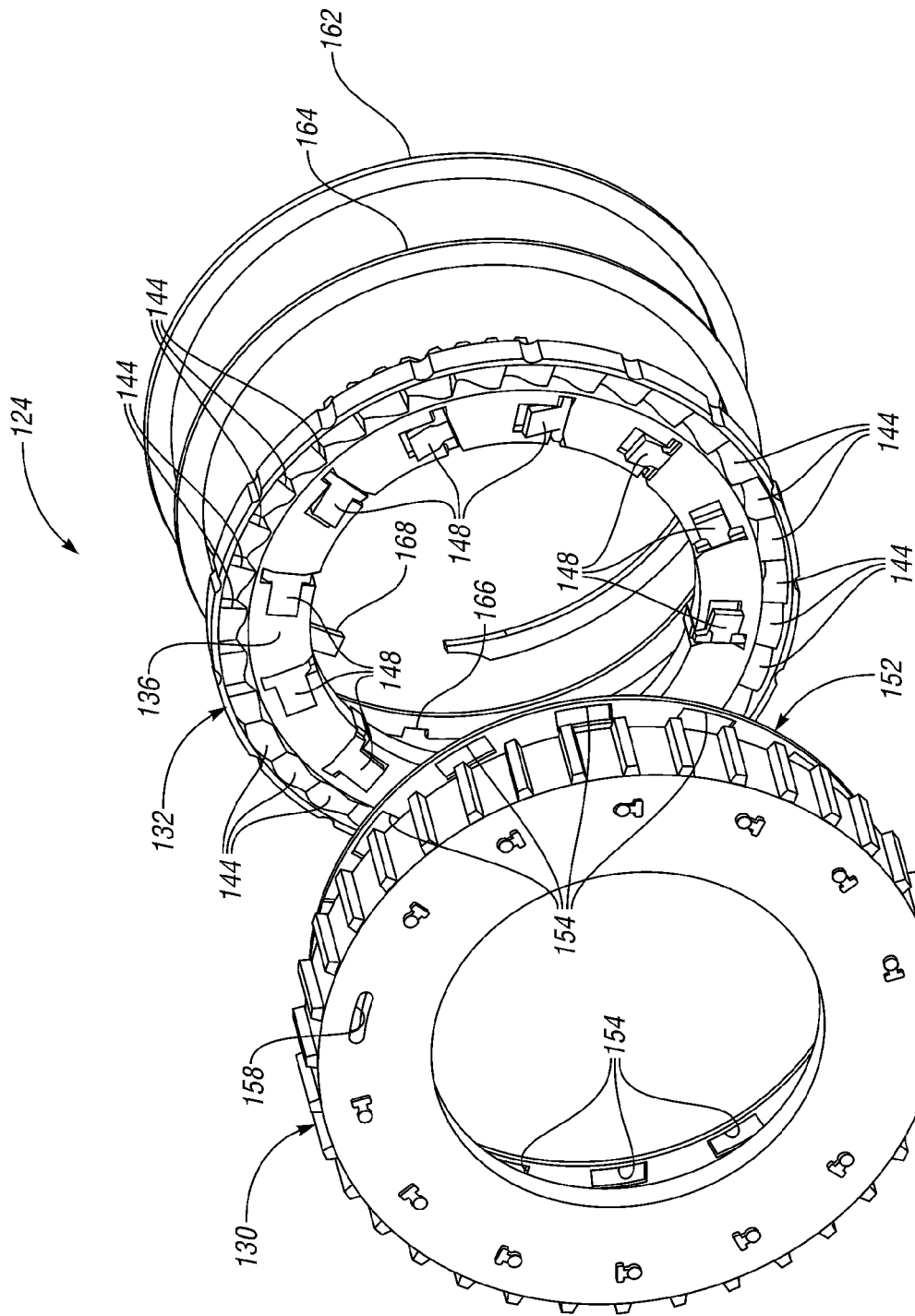
FIG. 3 is an exploded perspective schematic rear view of the embodiment of the assembly of FIG. 2.

With reference to FIG. 1, a transmission, generally indicated by 20, includes a housing 22 which receives an overrunning clutch, generally indicated at 24, that is constructed in accordance with one embodiment of the present invention and utilized with a externally splined gear 26 to control torque transmission. A second embodiment of an overrunning clutch or coupling assembly is generally indicated at 124 in FIGS. 2 and 3. In general, parts of the second embodiment which are the same or similar in structure and/or function to the corresponding parts of the first embodiment have the same reference number but increased by 100.

The overrunning clutch 24 of the first embodiment includes first and second annular clutch members, generally indicated at 30 and 32 in FIG. 1. In the second embodiment, the members are generally indicated at 130 and 132 in FIGS. 2-6. The members 30 and 32 (as well as the members 130 and 132) are supported with respect to each other for relative rotation about a common rotational axis. The first and second clutch members 30 and 32 have respective coupling faces 34 and 36 which are shown as facing axially along the rotational axis. In like fashion, the first and second clutch members 130 and 132 have respective coupling faces 134 and 136. It should be appreciated that the coupling faces 34 and 36 (as well as the coupling faces 134 and 136) can also be oriented to face radially with respect to the rotational axis.

The coupling face 34 of the clutch member 30 has pockets 38, spaced circumferentially about the rotational axis. Each pocket 38 includes a pivotal strut 40 received thereby, and each pocket also includes a spring (not shown) that pivotally biases its strut outwardly therefrom for locking while permitting movement back into the pocket to permit relative rotation between the clutch members 30 and 32.

In like fashion, the coupling face 134 of the clutch member 130 has pockets 138 spaced circumferentially about the rotational axis. Each pocket 138 includes a pivotal strut 140 received thereby and each pocket also includes a spring (not shown) that pivotally biases its strut outwardly therefrom for locking while permitting movement back into the pocket to permit relative motion between the clutch members 130 and 132.

The coupling face 36 of the second clutch member 32 has locking formations (not shown) that are engaged by the struts 40 upon projecting outwardly from the pockets 38 of the first clutch member 30 to prevent relative rotation of the clutch members with respect to each other while permitting relative rotation of the clutch members with respect to each other in the opposite direction, which is permitted by pivoting of the struts 40 into the pockets 38 against the bias of their associate springs. It should be understood that the relative rotation can include rotation of both clutch members or rotation of only one of the clutch members while the other is held from rotation as shown in FIG. 1 because it is externally splined.

In like fashion, the coupling face 136 of the second clutch member 132 has locking formations 144 that are engaged by the struts 140 upon projecting outwardly from the pockets 148 of the first clutch member 130 to prevent relative rotation of the clutch members with respect to each other while permitting relative rotation of the clutch members with respect to each other in the opposite direction, which is permitted by pivoting of the struts 140 into the pockets 138 against the bias of their associate springs. It should be understood that the relative rotation can include rotation of both clutch members or rotation of only one of the clutch members while the other is held from rotation.

The coupling face (36 or 136) of the second clutch member (32 or 132) has a second set of pockets (not shown in FIG. 1, 146 in FIGS. 2-6) spaced about the rotational axis. Each pocket of the second set has a pivotal forward strut (48 in FIG. 2, 148 in FIGS. 2-6) received thereby. Each pocket 146 of the second set includes a spring (not shown in either embodiment) that pivotally biases its strut outwardly therefrom for locking.

The coupling face (34 or 134) of the first clutch member (30 or 130) has a first set of locking formations (50 in FIG. 1, 150 in FIGS. 2-6) that are engaged by the forward struts (48 or 148) upon projecting outwardly from the pockets (not shown in FIG. 1, 146—in FIGS. 2-6) of the second clutch member (32 or 132) to prevent relative rotation of the clutch members (30 and 32 or 130 and 132) with respect to each other in a first direction while permitting relative rotation of the clutch members (30 and 32 or 130 and 132) with respect to each other in the opposite second direction by pivoting of the forward struts (48 or 148) in the pockets (146 in FIGS. 2-6) of the second clutch members (32 or 132).

Figure 4:
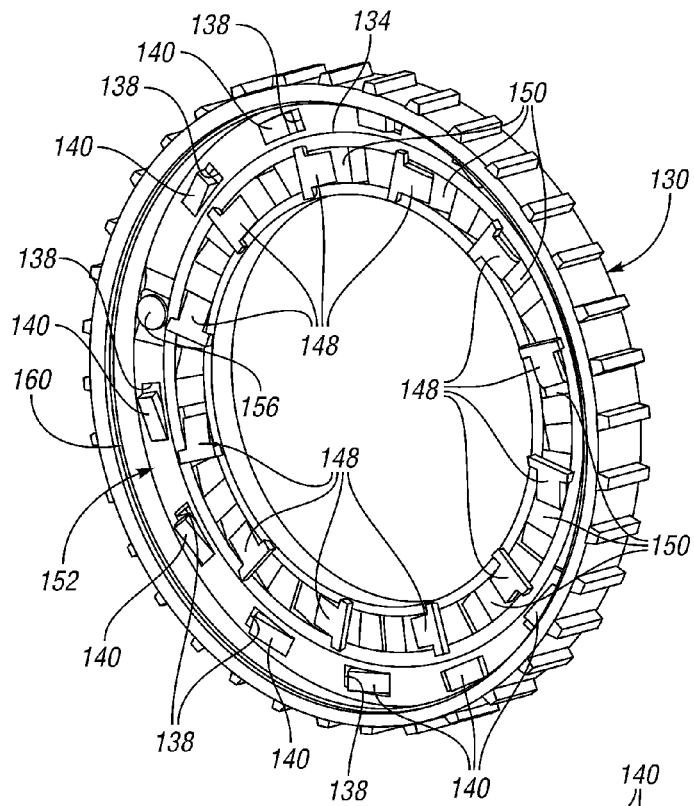
FIG. 4 is a perspective schematic view of a stationary annular coupling member of the assembly of FIGS. 2 and 3 with its pivotal reverse struts extending through apertures of a control element in a first position and pivotal forward struts shown without their corresponding rotational annular coupling member for illustrative purposes.
Figure 5:
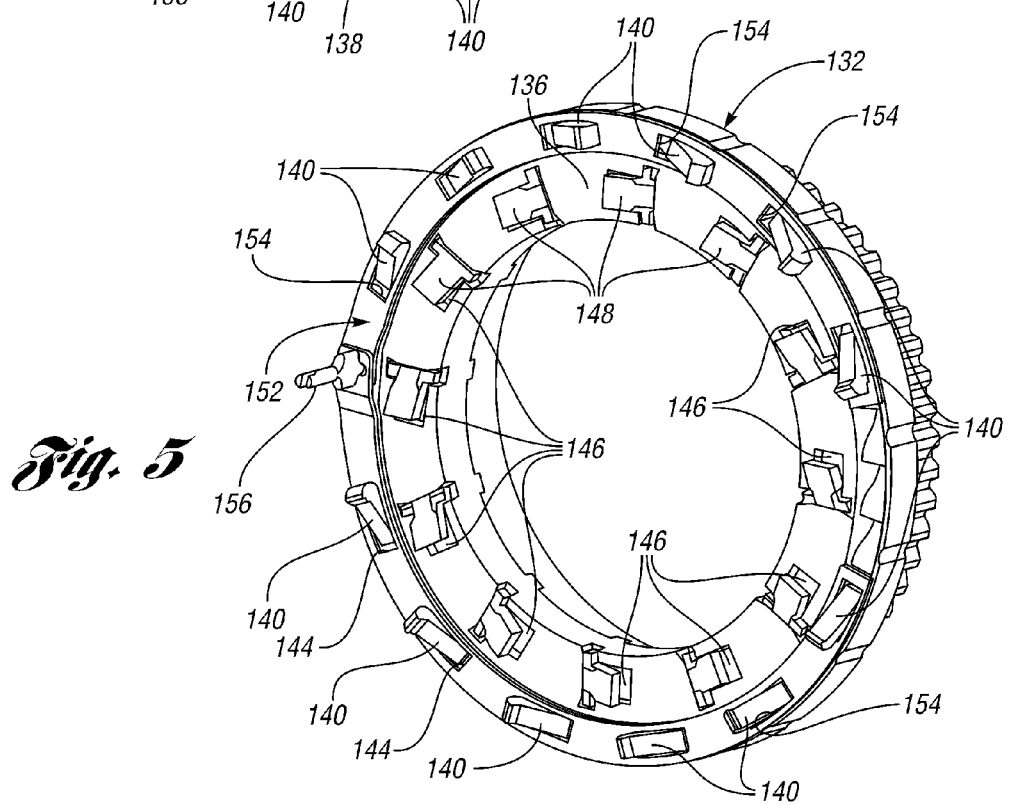
FIG. 5 is a perspective schematic view of the rotational annular coupling member of the assembly of FIGS. 2 and 3 with pivotal reverse struts shown without their corresponding stationary annular coupling member for illustrative purposes.
Figure 6:
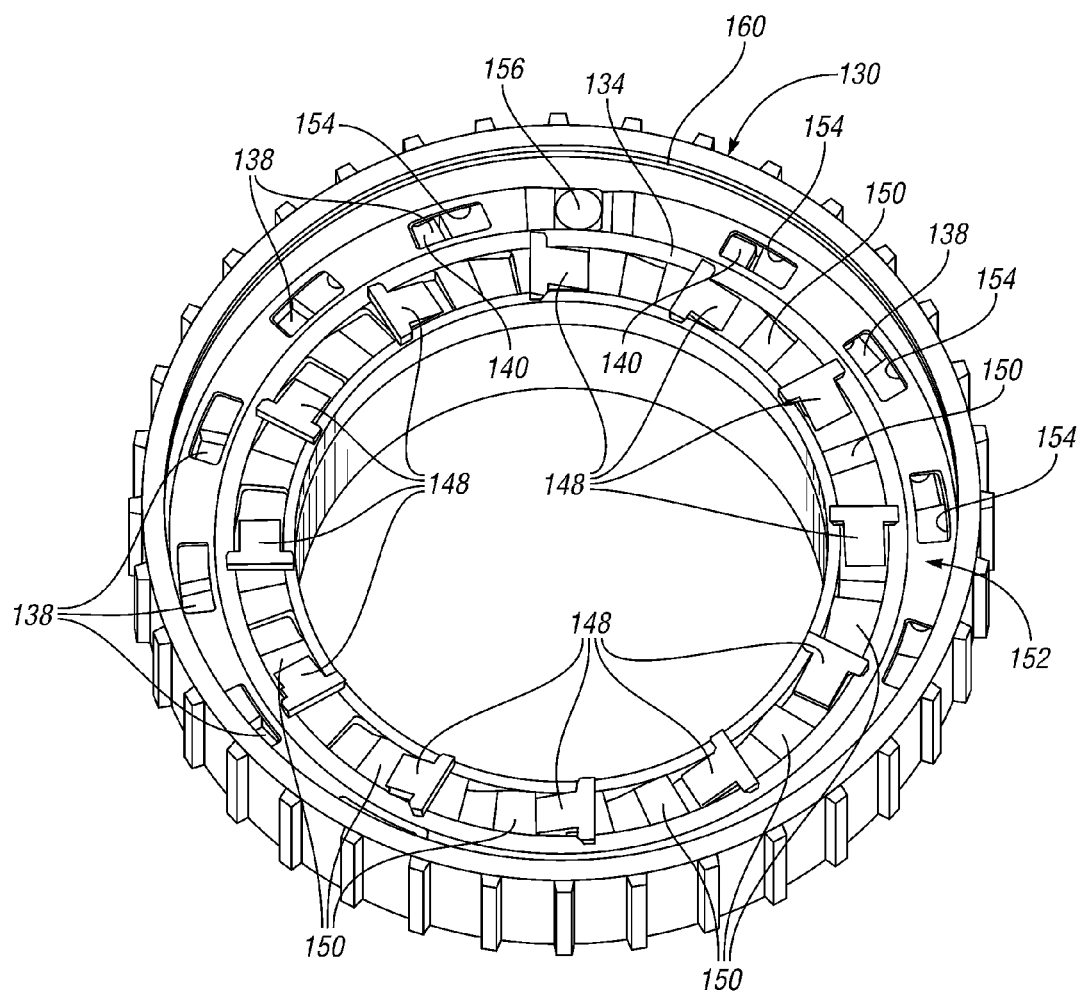
FIG. 6 is a perspective schematic view, similar to the view of FIG. 4, of the stationary coupling member with the reverse struts maintained within their pockets by the control element in its second position.

A control element, generally indicated at 52 in FIG. 1 and 152 in FIGS. 2-6, is mounted for controlled, shifting movement between the coupling faces (34 and 36 or 134 and 136) relative to the first set of pockets (38 or 138) and operable for controlling position of only the reverse struts (40 or 140) without controlling the position of the forward struts (48 or 148). The control element (52 or 152) has at least one opening (54 or 154) which extends completely therethrough to allow at least one of the reverse struts (40 or 140) to extend therethrough to engage at least one of the second set of locking formations (144 in FIGS. 2-6) in a first position (as shown in FIGS. 4 and 5) of the control element (52 or 152). The control element (52 or 152) maintains the reverse struts (40 or 140) in their pockets (38 or 138) in a second position (as shown in FIG. 6) of the control element (52 or 152). The reverse struts (40 or 140) are located along a line or row spaced away from a line or row along which the forward struts (48 or 148) are located. The line or row of the reverse struts is preferably curved and concentric to the curved line or row of the forward struts. The control element (52 or 152) is connected to an actuator arm (not shown in FIG. 1, 156 in FIGS. 2-6) which, in turn, is connected to a hydraulic valve or solenoid (not shown) to shift or rotate the control element (52 or 152) between its control positions. The actuator arm extends through a slot 158 formed through the coupling face 134 of the first coupling member 130.

The clutch member (30 or 130) has an annular groove (60 or 160) that receives a snap ring (62 or 162) of a generally annular shape. An annular thrust plate (64 or 164) is located axially along the rotational axis between the clutch member (32 or 132) and the snap ring (62 or 162). The thrust plate (64 or 164) has a first axial face that contacts the snap ring and has a second axial face oriented in the opposite axial direction as the first axial face and contacting only the clutch member (32 or 132) without contacting the clutch member (30 or 130). Furthermore, the thrust plate (64 or 164) has a retainer (not shown in FIG. 1 but at 166 in FIGS. 2-6) projecting therefrom to prevent rotation of the thrust plate.

The thrust plate embodiment is a sheet metal stamping made from a metal such as steel, brass, aluminum or bronze. It is also possible to make the thrust plate as a synthetic resin molding.

The snap ring (62 or 162) has opposite circumferential ends (68 or 168) that are spaced from each other and between which the thrust plate retainer is received to prevent thrust plate rotation. More specifically, the sheet metal thrust plate is stamped to provide the retainer which extends axially with respect to the rotational axis at an oblique angle.

In another embodiment of the clutch, the thrust plate is molded from a synthetic resin and has an axially projecting retainer that is also received between the circumferential opposite ends of the snap ring so as to prevent thrust plate rotation.

The geometry of the pockets 46 and 146 prevents displacement of the forward struts 48 and 148 toward the plate or member 130 under the influence of centrifugal force when the plate 132 overruns the plate 130.

The centrifugal force acting on the forward struts creates a centrifugal force component vector that tends to resist displacement of the forward strut out of its pocket when the planar one-way clutch assembly is freewheeling. A force vector is created by reason of a negative draft angle formed at the radially outward edge of the pocket. The negative draft angle is created during manufacture of the pocket plate 32 or 132. A negative draft angle can be achieved by upsetting the metal at the radially outward wall of a pocket.

Preferably, the plate 30 or 130 and the plate 32 or 132 can be formed using powder metal technology. During the sintering operation in the powder metal casting technique, the notches or formations can be formed readily when the plate 32 or 132 still is in its heated state while it is most malleable. The negative draft angle on the pockets will resist displacement of the forward struts even when the pocket plate 30 or 132 rotates at high speeds; for example, speeds greater than 2500 rpm. This greatly improves the overrunning clutch performance, reduces wear on the struts, and avoids any tendency of the struts to create noise due to ratcheting of the struts across the pockets of the pocket plate when the planar overrunning clutch assembly is freewheeling.

The recesses or locking formations of one member 30 or 130 each include a ramped surface opposite the member's load-bearing shoulder. Each ramped surface includes a convex surface portion which engages the forward struts during clutch overrun so as to urge the struts into the non-coupling position.

In the exemplary clutch assembly, a quantity of lubricating fluid (not shown) is disposed between the members to impart additional stability to the forward struts through fluid-damping, while further advantageously serving to reduce component wear. Significantly, however, the presence of convex surface portions and the attendant increase in strut stability during clutch overrun permits use of a substantially reduced quantity of such lubricating fluid, when compared to known fluid-lubricated clutches. Such a reduction in the required quantity of lubricating fluid includes such potential correlative benefits, for example, as reduced fluidic drag on the driven member during clutch overrun, a reduced oil supply requirement, and less stringent requirements for peripheral oil seals. It will be appreciated, however, that it is contemplated to use any other suitable mechanism for reducing component wear, including manufacture of the forward struts and the ramped surfaces of the driven member from a self-lubricating material.

In summary, by placing the forward struts (48 or 148) in the rotating member (32 or 132) and not the stationary member (30 or 130) centrifugal forces help "hold" the forward struts in their pockets at high speeds. Also, the formations (50 or 150) with their ramps permit a hydrodynamic effect to cushion the forward struts 48 or 148 as they travel over the formations. In this way, overrun life is improved (with minimal oil) and spin loss is reduced due to less viscous drag.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A controllable or selectable overrunning coupling assembly adapted for use with pressurized fluid, the assembly comprising:

first and second annular coupling members that are supported with respect to each other for relative rotation about a common rotational axis, the first and second coupling members having annular coupling faces that oppose each other and are oriented to face axially along the rotational axis wherein the first coupling member is a stationary member and the second coupling member is a rotating member;

the coupling face of the first coupling member having a first set of pockets spaced about the rotational axis, each pocket of the first set having a pivotal reverse strut received thereby;

the coupling face of the second coupling member having a second set of pockets spaced about the rotational axis, each pocket of the second set having a pivotal forward strut received thereby wherein centrifugal forces help hold the forward struts in their respective pockets at high rotational speed of the second coupling member;

the coupling face of the first coupling member having a first set of locking formations that are engaged by the forward struts upon projecting outwardly from the pockets of the second coupling member to prevent relative rotation of the coupling members with respect to each other in a first direction while permitting relative rotation of the coupling members with respect to each other in a second direction opposite the first direction by pivoting of the forward struts in the pockets of the second coupling member;

the coupling face of the second coupling member having a second set of locking formations that are engaged by the reverse struts upon projecting outwardly from the pockets of the first coupling member to prevent relative rotation of the coupling members with respect to each other in the second direction while permitting relative rotation of the coupling members with respect to each other in the first direction by pivoting of the reverse struts in the pockets of the first coupling member; and a control element mounted for controlled, shifting movement between the coupling faces relative to the first set of pockets and operable for controlling position of only the reverse struts without controlling the position of the forward struts, the control element allowing at least one of the reverse struts to engage at least one of the second set of locking formations in a first position of the control element and wherein the control element maintains the reverse struts in their pockets in a second position of the control element and wherein the reverse struts are located along a first line or row radially spaced away from a second line or row along which the forward struts are located wherein geometric dimensions of the second set of pockets resist displacement of the forward struts towards the first coupling member under the influence of centrifugal force when the second coupling member overruns the first coupling member without the need for a control plate or element to control position of the forward struts, thereby reducing spin losses during overrun.

2. The assembly as claimed in claim 1, wherein the reverse struts are radially located outside of the forward struts.

3. The assembly as claimed in claim 2, wherein the control element is controllably rotatable about the rotational axis between the first and second positions and wherein the first set of pockets are spaced a first radius from the rotational axis and the second set of pockets are spaced a second radius less than the first radius from the rotational axis.

4. The assembly as claimed in claim 1, wherein the control element is generally round.

5. The assembly as claimed in claim 4, wherein the control element has opposite circumferential ends.

6. The assembly as claimed in claim 1, wherein one of the coupling members has an annular groove and wherein the assembly further comprises:

a generally round snap ring that is received by the annular groove in the one coupling member; and an annular thrust plate located axially along the rotational axis between the other coupling member and the snap ring, the thrust plate having a retainer projecting therefrom to prevent rotation of the thrust plate.

7. The assembly as claimed in claim 6, wherein the snap ring has circumferentially spaced opposite ends and the retainer axially extends between the opposite ends of the snap ring to prevent rotation of the thrust plate.

8. The assembly as claimed in claim 1 wherein the geometric dimensions include a negative draft angle formed at a radially outward edge of each of the second set of pockets.

9. A controllable or selectable overrunning clutch adapted for use with pressurized fluid, comprising:

first and second annular clutch members that are supported with respect to each other for relative rotation about a common rotational axis, the first and second clutch members having annular coupling faces that oppose each other and are oriented to face axially along the rotational axis wherein the first coupling member is a stationary member and the second coupling member is a rotating member;

the coupling face of the first clutch member having a first set of pockets spaced about the rotational axis, each pocket of the first set having a pivotal reverse strut received thereby;

the coupling face of the second clutch member having a second set of pockets spaced about the rotational axis, each pocket of the second set having a pivotal forward strut received thereby wherein centrifugal forces help hold the forward struts in their respective pockets at high rotational speed of the second coupling member;

the coupling face of the first clutch member having a first set of locking formations that are engaged by the forward struts upon projecting outwardly from the pockets of the second clutch member to prevent relative rotation of the clutch members with respect to each other in a first direction while permitting relative rotation of the clutch members with respect to each other in a second direction opposite the first direction by pivoting of the forward struts in the pockets of the second clutch member;

the coupling face of the second clutch member having a second set of locking formations that are engaged by the reverse struts upon projecting outwardly from the pockets of the first clutch member to prevent relative rotation of the clutch members with respect to each other in the second direction while permitting relative rotation of the clutch members with respect to each other in the first direction by pivoting of the reverse struts in the pockets of the first clutch member; and a control element mounted for controlled, shifting movement between the coupling faces relative to the first set of pockets and operable for controlling position of only the reverse struts without controlling the position of the forward struts, the control element allowing at least one of the reverse struts to engage at least one of the second set of locking formations in a first position of the control element and wherein the control element maintains the reverse struts in their pockets in a second position of the control element and wherein the reverse struts are located along a curved line or row radially spaced away from and concentric to a curved line or row along which the forward struts are located wherein geometric dimensions of the second set of pockets resist displacement of the forward struts towards the first coupling member under the influence of centrifugal force when the second coupling member overruns the first coupling member without the need for a control plate or element to control position of the forward struts, thereby reducing spin losses during overrun.

10. The clutch as claimed in claim 9 wherein the geometric dimensions include a negative draft angle formed at a radially outward edge of each of the second set of pockets.

11. A controllable or selectable overrunning clutch adapted for use with pressurized fluid, comprising:

first and second annular clutch members that are supported with respect to each other for relative rotation about a common rotational axis, the first and second clutch members having annular coupling faces that oppose each other and are oriented to face axially along the rotational axis and one of the clutch members has an annular groove wherein the first coupling member is a stationary member and the second coupling member is a rotating member;

the coupling face of the first clutch member having a first set of pockets spaced about the rotational axis, each pocket of the first set having a pivotal reverse strut received thereby, and each pocket of the first set including a spring that pivotally biases its strut outwardly therefrom for locking;

the coupling face of the second clutch member having a second set of pockets spaced about the rotational axis, each pocket of the second set having a pivotal forward strut received thereby, and each pocket of the second set including a spring that pivotally biases its strut outwardly therefrom for locking wherein centrifugal forces help hold the forward struts in their respective pockets at high rotational speed of the second coupling member;

the coupling face of the first clutch member having a first set of locking formations that are engaged by the forward struts upon projecting outwardly from the pockets of the second clutch member to prevent relative rotation of the clutch members with respect to each other in a first direction while permitting relative rotation of the clutch members with respect to each other in a second direction opposite the first direction by pivoting of the forward struts in the pockets of the second clutch member;

the coupling face of the second clutch member having a second set of locking formations that are engaged by the reverse struts upon projecting outwardly from the pockets of the first clutch member to prevent relative rotation of the clutch members with respect to each other in the second direction while permitting relative rotation of the clutch members with respect to each other in the first direction by pivoting of the reverse struts in the pockets of the first clutch member;

a control element mounted for controlled, shifting movement between the coupling faces relative to the first set of pockets and operable for controlling position of only the reverse struts without controlling the position of the forward struts, the control element having at least one opening which extends completely therethrough to allow at least one of the reverse struts to extend therethrough to engage at least one of the second set of locking formations in a first position of the control element and wherein the control element maintains the reverse struts in their pockets in a second position of the control element and wherein the reverse struts are located along a line or row radially spaced away from a line or row along which the forward struts are located;

a generally round snap ring that is received by the annular groove in the one clutch member; and an annular thrust plate located axially along the rotational axis between the other clutch member and the snap ring, the thrust plate having a retainer projecting therefrom to prevent rotation of the thrust plate wherein geometric dimensions of the second set of pockets resist displacement of the forward struts towards the first coupling member under the influence of centrifugal force when the second coupling member overruns the first coupling member without the need for a control plate or element to control position of the forward struts, thereby reducing spin losses during overrun.

12. The clutch as claimed in claim 11 wherein the geometric dimensions include a negative draft angle formed at a radially outward edge of each of the second set of pockets.

* * * * *